No. 763,190. PATENTED JUNE 21, 1904.
C. J. MADONNA.
TRICYCLE.
APPLICATION FILED NOV. 14, 1903.
NO MODEL.
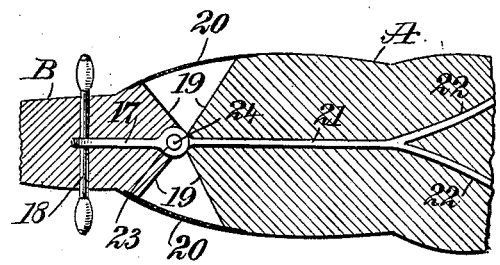
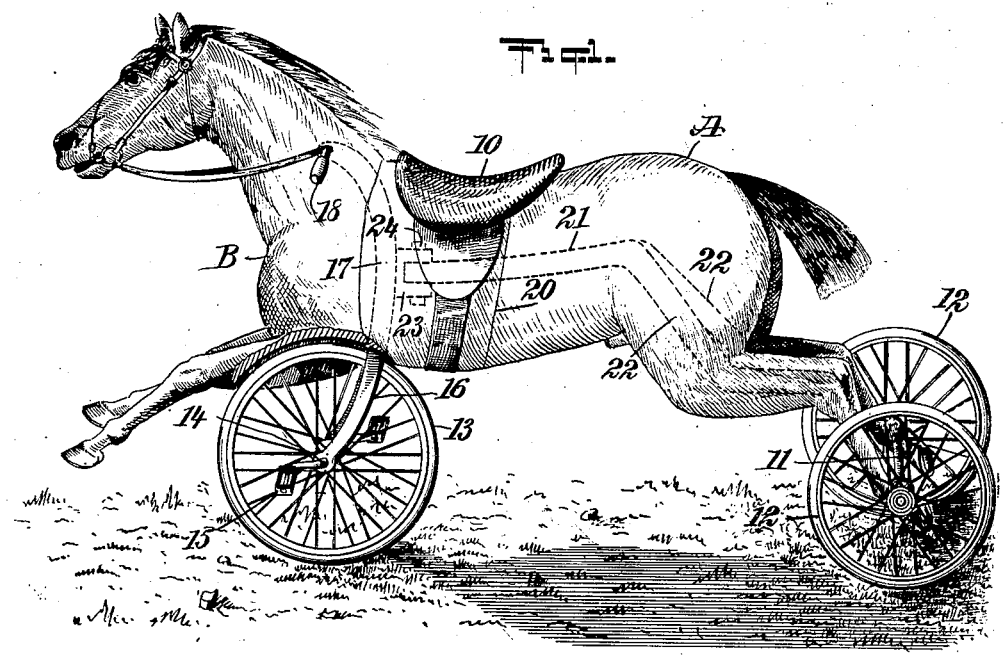
WITNESSES:
INVENTOR
Charles J. Madonna,
BY
ATTORNEYS No. 763,190.                                         Patented June 21, 1904.

UNITED STATES PATENT OFFICE.

CHARLES J. MADONNA, OF NEW YORK, N. Y.

TRICYCLE.

SPECIFICATION forming part of Letters Patent No. 763,190, dated June 21, 1904.

Application filed November 14, 1903. Serial No. 181,225. (No model.)

*To all whom it may concern:*

Be it known that I, CHARLES J. MADONNA, a citizen of the United States, and a resident of the city of New York, borough of Brooklyn, in the county of Kings and State of New York, have invented a new and useful Improvement in Tricycles, of which the following is a full, clear, and exact description.

The purpose of my invention is to provide a race-horse tricycle, or a tricycle in which the body is in the form of a horse in two pivotally-connected parts, the rear part being supported by two wheels on the same axle and the forward part by a single wheel which is a steering and at the same time a driving wheel, so that the head of the horse-like body always points in the direction of travel.

A further purpose of the invention is to provide means for strengthening the sections of the body and to provide a handle-bar which is connected with the carrier of the front or steering wheel and by means of which the front portion of the body, and consequently the forward wheel, is turned as desired.

The invention consists in the novel construction and combination of the several parts, as will be hereinafter fully set forth, and pointed out in the claim.

Reference is to be had to the accompanying drawings, forming a part of this specification, in which similar characters of reference indicate corresponding parts in both the figures.

Figure 1 is a side elevation of the improved vehicle, the forward side portion being broken away; and Fig. 2 is a horizontal section through a part of the front and back of the body.

The body, which is shown in the form of a horse, although the likeness of any other animal may be employed, is made in two sections, a rear section A and a front section B, the connection between the two sections being at a point forward of the seat or saddle 10. An axle 11 is journaled in what represents the rear legs of the animal represented by the body, and on the said axle at each end supporting-wheels 12 of suitable size are mounted to turn, or the said wheels may be secured to the axle and the axle turned with the wheels.

A single forward supporting and steering wheel 13 is employed, secured to an axle 14, having pedal-arms 15 at its ends, which pedal-arms are within convenient reach of the feet of the rider of the vehicle. The forward shaft or axle 14 is mounted to turn in the bifurcated or forked lower portion 16 of an upright 17, which is carried upward through the front section B of the body at or near its pivotal connection with the rear section A, and the said upright 17 is preferably forwardly curved at what represents the neck of the animal and is there attached to a handle-bar 18, which extends out beyond the sides of the body, as is shown in both figures, and particularly in Fig. 2.

Where the two sections A and B of the body meet their opposing surfaces are oppositely inclined, as is shown at 19 in Fig. 2, thus providing ample space between the opposing faces of the two body-sections A and B to enable the front section B to be turned to the right or to the left, as may be required, carrying the front wheel 13 with it, and thus guiding the vehicle to the right or to the left. The spaces formed in the body by the beveling of the opposing faces of its sections are preferably covered at the outside by elastic blankets 20 or blankets of canvas made full enough not to interfere with the side movement of the front section of the body.

A stay-bar 21 extends about centrally and horizontally through the rear section A of the body, and this stay-bar is provided with a bifurcated rear portion 22, the members of which bifurcated portion extend down into the rear limbs of the animal which the body represents to strengthen the said limbs, and the forward end of the stay-bar 21 is passed between lugs 23, formed upon or carried by the upright 17, as is shown by dotted lines in Fig. 1, and a pivot-pin 24 is passed through these lugs and through the entering end of the stay-bar 21, as is also shown best in dotted lines in Fig. 1.

Under the construction shown the body of the tricycle represents a running horse, and motion is imparted to the body by the foot action of the rider on the pedal-arms 15, and the vehicle may be directed either to the right or to the left, or it may be directed straight ahead, according to the direction in which the handle-bar 18 is turned, and consequently the front section B of the body.

Having thus described my invention, I claim as new and desire to secure by Letters Patent—

A tricycle comprising a body in the form of a running animal, constructed in two sections, the opposing faces of the sections being beveled in opposite directions, a stay-bar extending through the rear section of the body, having its rear portion bifurcated and carried through the leg portions of the said rear section, an upright secured in the forward section of the body, a handle-bar at the upper end of the said upright, extending beyond opposite sides of the body, a fork at the lower end of the upright, a single wheel journaled between the members of the said fork, pedal-arms connected with the wheel, and blankets of a yielding material covering the opening between the opposing faces of the body-sections at the outer side portions of the said body-sections, as set forth.

In testimony whereof I have signed my name to this specification in the presence of two subscribing witnesses.

CHARLES J. MADONNA.

Witnesses:
   ANTONIO V. SASSO,
   NICHELS M. TRIMBLES.